US010610045B2

(12) United States Patent
Marina et al.

(10) Patent No.: US 10,610,045 B2
(45) Date of Patent: Apr. 7, 2020

(54) BEVERAGE SYSTEM INCLUDING A REMOVABLE PIERCER

(71) Applicant: PepsiCo, Inc., Purchase, NY (US)

(72) Inventors: Carlos Hernan Marina, Deerfield Beach, FL (US); Dario Federico Stanziano, Bueno Aires (AR); Hernán Javier Giorgi, Buenos Aires (AR); Tomás Águila, Buenos Aires (AR)

(73) Assignee: PepsiCo, Inc., Purchase, NY (US)

( * ) Notice: Subject to any disclaimer, the term of this patent is extended or adjusted under 35 U.S.C. 154(b) by 57 days.

(21) Appl. No.: 15/182,356

(22) Filed: Jun. 14, 2016

(65) Prior Publication Data

US 2017/0354289 A1 Dec. 14, 2017

(51) Int. Cl.
| | | |
|---|---|---|
| *B65D 81/32* | (2006.01) | |
| *A47J 31/40* | (2006.01) | |
| *A47J 31/00* | (2006.01) | |
| *B65D 51/28* | (2006.01) | |
| *B65D 41/04* | (2006.01) | |
| *B65D 55/16* | (2006.01) | |
| *B65D 85/804* | (2006.01) | |

(52) U.S. Cl.
CPC ........... *A47J 31/407* (2013.01); *A47J 31/005* (2013.01); *B65D 41/04* (2013.01); *B65D 51/2835* (2013.01); *B65D 55/16* (2013.01); *B65D 81/3211* (2013.01); *B65D 85/804* (2013.01)

(58) Field of Classification Search
CPC .................. B65D 81/3211; B65D 51/2835
USPC ........... 99/323, 295, 299; 206/222, 219, 0.5; 215/DIG. 8; 222/83, 81, 80
See application file for complete search history.

(56) References Cited

U.S. PATENT DOCUMENTS

| | | | |
|---|---|---|---|
| 2,073,273 A | 3/1937 | Erna Korn et al. | |
| 2,451,195 A | 10/1948 | Brown | |

(Continued)

FOREIGN PATENT DOCUMENTS

| | | |
|---|---|---|
| AT | 395301 B | 11/1992 |
| CN | 201334159 Y | 10/2009 |

(Continued)

OTHER PUBLICATIONS

International Search Report and Written Opinion dated Oct. 20, 2017, received in International Patent Application No. PCT/US2017/036479, filed Jun. 8, 2017.

(Continued)

*Primary Examiner* — Reginald Alexander
(74) *Attorney, Agent, or Firm* — Sterne, Kessler, Goldstein & Fox, P.L.L.C.

(57) ABSTRACT

Apparatuses related to a beverage system. The system includes a piercing apparatus that includes an inner ring composed of a rigid material and an outer ring composed of a flexible material that encompasses the inner ring. The outer ring has an upper portion disposed above the inner ring that has a greater range of motion than the outer ring that encompasses the inner ring. The piercing apparatus further includes a piercer composed of a rigid material that is connected to the inner ring by a plurality of arms that radially extend from the piercer to the inner ring. The plurality of arms define a plurality of openings between the arms. The outer ring includes a protrusion that circumferentially protrudes outward from an outer surface of the outer ring.

30 Claims, 12 Drawing Sheets

(56) References Cited

U.S. PATENT DOCUMENTS

| | | | |
|---|---|---|---|
| 2,778,739 A | 1/1957 | Rodth | |
| 2,899,886 A | 8/1959 | Rodth | |
| 2,968,560 A | 1/1961 | Goros | |
| 3,030,874 A | 4/1962 | Fiori | |
| 3,083,101 A | 3/1963 | Noury | |
| 3,295,998 A | 1/1967 | Goros | |
| 3,403,617 A | 10/1968 | Lampe | |
| 3,561,349 A | 2/1971 | Endo et al. | |
| 3,790,029 A | 2/1974 | Ward | |
| 4,136,202 A | 1/1979 | Favre | |
| 4,220,259 A | 9/1980 | Lagnaeux | |
| 4,391,309 A | 7/1983 | Steiner | |
| 4,471,689 A | 9/1984 | Piana | |
| 4,759,472 A | 7/1988 | Strenger | |
| 4,808,346 A | 2/1989 | Strenger | |
| 4,846,052 A | 7/1989 | Favre et al. | |
| 4,867,993 A | 9/1989 | Nordskog | |
| 4,886,674 A | 12/1989 | Seward et al. | |
| 4,915,261 A | 4/1990 | Strenger | |
| 5,008,013 A | 4/1991 | Favre et al. | |
| 5,011,700 A | 4/1991 | Gustafson et al. | |
| 5,083,677 A | 1/1992 | Balley et al. | |
| 5,172,831 A | 2/1992 | Burrows | |
| 5,197,374 A | 3/1993 | Fond | |
| 5,220,259 A | 6/1993 | Wener et al. | |
| 5,242,702 A | 9/1993 | Fond | |
| 5,246,142 A | 9/1993 | DiPalma et al. | |
| 5,277,103 A | 1/1994 | Cox | |
| 5,323,832 A | 6/1994 | Burrows | |
| 5,325,765 A | 7/1994 | Sylvan et al. | |
| 5,327,815 A | 7/1994 | Fond et al. | |
| 5,343,799 A | 9/1994 | Fond | |
| 5,347,916 A | 9/1994 | Fond et al. | |
| 5,398,595 A | 3/1995 | Fond et al. | |
| 5,398,596 A | 3/1995 | Fond | |
| 5,402,707 A | 4/1995 | Fond et al. | |
| 5,472,719 A | 12/1995 | Favre | |
| 5,649,472 A | 7/1997 | Fond et al. | |
| 5,656,311 A | 8/1997 | Fond | |
| 5,656,316 A | 8/1997 | Fond et al. | |
| 5,897,899 A | 4/1999 | Fond | |
| 5,948,455 A | 9/1999 | Schaeffer et al. | |
| 5,980,959 A | 11/1999 | Frutin | |
| 6,025,000 A | 2/2000 | Fond et al. | |
| 6,026,732 A | 2/2000 | Kollep et al. | |
| 6,068,871 A | 5/2000 | Fond et al. | |
| 6,079,315 A | 6/2000 | Beaulieu et al. | |
| 6,109,168 A | 8/2000 | Illy et al. | |
| 6,117,471 A | 9/2000 | King | |
| 6,152,296 A * | 11/2000 | Shih | B65D 51/2835 206/222 |
| 6,161,819 A | 12/2000 | Edwards | |
| 6,165,523 A | 12/2000 | Story | |
| 6,182,554 B1 | 2/2001 | Beaulieu et al. | |
| 6,240,832 B1 | 6/2001 | Schmed et al. | |
| 6,245,371 B1 | 6/2001 | Gutwein et al. | |
| 6,305,576 B1 | 10/2001 | Leoncavallo | |
| 6,358,545 B1 | 3/2002 | Chandler et al. | |
| 6,386,392 B1 | 5/2002 | Argentieri et al. | |
| 6,405,637 B1 | 6/2002 | Cai | |
| 6,533,113 B2 * | 3/2003 | Moscovitz | B65D 51/2835 206/222 |
| 6,606,938 B2 | 8/2003 | Taylor | |
| 6,607,762 B2 | 8/2003 | Lazaris et al. | |
| 6,619,188 B1 | 9/2003 | Meador | |
| 6,645,537 B2 | 11/2003 | Sweeney et al. | |
| 6,655,260 B2 | 12/2003 | Lazaris et al. | |
| 6,740,345 B2 | 5/2004 | Cai | |
| 6,758,130 B2 | 7/2004 | Sargent et al. | |
| 6,758,372 B2 | 7/2004 | Studer et al. | |
| 6,777,007 B2 | 8/2004 | Cai | |
| 6,805,041 B2 | 10/2004 | Colston et al. | |
| 6,810,788 B2 | 11/2004 | Hale | |
| 6,849,285 B2 | 2/2005 | Masek et al. | |
| 6,869,627 B2 | 3/2005 | Perkovic et al. | |
| D506,926 S | 7/2005 | Halliday et al. | |
| 6,948,420 B2 | 9/2005 | Kirschner et al. | |
| 6,951,275 B2 | 10/2005 | Serra Galdos | |
| 6,966,251 B2 | 11/2005 | Yoakim | |
| 6,971,304 B1 | 12/2005 | Lin | |
| 6,994,015 B2 | 2/2006 | Bruinsma | |
| 6,997,103 B2 | 2/2006 | Shaw et al. | |
| 7,028,604 B2 | 4/2006 | Cortese | |
| 7,032,745 B2 | 4/2006 | Saulle | |
| 7,032,818 B2 | 4/2006 | Thomas et al. | |
| 7,059,239 B2 | 6/2006 | Balkau | |
| 7,077,053 B2 | 7/2006 | Kraan | |
| 7,097,074 B2 | 8/2006 | Halliday et al. | |
| 7,100,496 B2 | 9/2006 | Majer Doglioni | |
| 7,131,369 B2 | 11/2006 | Gantt et al. | |
| 7,153,530 B2 | 12/2006 | Masek et al. | |
| 7,165,488 B2 | 1/2007 | Bragg et al. | |
| 7,210,401 B1 | 5/2007 | Rolfes et al. | |
| 7,213,506 B2 | 5/2007 | Halliday et al. | |
| 7,219,598 B2 | 5/2007 | Halliday et al. | |
| 7,226,628 B2 | 6/2007 | Cai | |
| 7,231,869 B2 | 6/2007 | Halliday et al. | |
| 7,243,597 B2 | 7/2007 | Hu et al. | |
| 7,243,598 B2 | 7/2007 | Halliday et al. | |
| 7,255,039 B2 | 8/2007 | Halliday et al. | |
| 7,258,061 B2 | 8/2007 | Campbell et al. | |
| 7,279,188 B2 | 10/2007 | Arrick et al. | |
| 7,287,461 B2 | 10/2007 | Halliday et al. | |
| 7,308,851 B2 | 12/2007 | Halliday | |
| 7,316,178 B2 | 1/2008 | Halliday et al. | |
| 7,318,372 B2 | 1/2008 | Cooke | |
| 7,320,274 B2 | 1/2008 | Castellani | |
| 7,322,277 B2 | 1/2008 | Halliday et al. | |
| 7,328,651 B2 | 2/2008 | Halliday et al. | |
| 7,340,990 B2 | 3/2008 | Halliday et al. | |
| D567,021 S | 4/2008 | Bach et al. | |
| 7,350,456 B2 | 4/2008 | Blanc et al. | |
| 7,439,859 B2 | 10/2008 | Humphrey | |
| 7,578,386 B2 * | 8/2009 | Im | B65D 51/2864 206/221 |
| 7,635,012 B2 | 12/2009 | Johns et al. | |
| 7,896,155 B2 * | 3/2011 | Seelhofer | B65D 51/2835 206/219 |
| 7,992,735 B2 | 8/2011 | Bullard et al. | |
| 8,091,735 B2 | 1/2012 | Girard et al. | |
| 8,276,748 B2 | 10/2012 | Nyambi et al. | |
| 8,302,770 B2 | 11/2012 | Valentine | |
| 8,443,993 B1 | 5/2013 | Desselle | |
| 8,695,819 B1 | 4/2014 | Anderson | |
| 9,193,517 B2 | 11/2015 | Fontana | |
| 9,321,570 B2 | 4/2016 | Kim et al. | |
| 2001/0048957 A1 | 12/2001 | Lazaris et al. | |
| 2001/0052294 A1 | 12/2001 | Schmed et al. | |
| 2002/0015768 A1 | 2/2002 | Masek et al. | |
| 2002/0020659 A1 | 2/2002 | Sweeney et al. | |
| 2002/0023543 A1 | 2/2002 | Schmed et al. | |
| 2002/0048321 A1 | 4/2002 | Katayama | |
| 2002/0048621 A1 | 4/2002 | Boyd et al. | |
| 2002/0076471 A1 | 6/2002 | Olsson | |
| 2002/0078831 A1 | 6/2002 | Cai | |
| 2002/0088807 A1 | 7/2002 | Perkovic et al. | |
| 2002/0121198 A1 | 9/2002 | Kollep et al. | |
| 2002/0129712 A1 | 9/2002 | Westbrook et al. | |
| 2002/0139839 A1 | 10/2002 | Catan | |
| 2002/0144603 A1 | 10/2002 | Taylor | |
| 2002/0144604 A1 | 10/2002 | Winkler et al. | |
| 2002/0148356 A1 | 10/2002 | Lazaris et al. | |
| 2003/0005826 A1 | 1/2003 | Sargent et al. | |
| 2003/0039731 A1 | 2/2003 | Dalton et al. | |
| 2003/0056655 A1 | 3/2003 | Kollep et al. | |
| 2003/0071806 A1 | 4/2003 | Annand | |
| 2003/0159589 A1 | 8/2003 | Meador | |
| 2003/0222089 A1 | 12/2003 | Hale | |
| 2004/0005384 A1 | 1/2004 | Cai | |
| 2004/0055472 A1 | 3/2004 | Stoner | |
| 2004/0115310 A1 | 6/2004 | Yoakim et al. | |
| 2004/0173102 A1 | 9/2004 | Halliday et al. | |
| 2004/0177764 A1 | 9/2004 | Halliday et al. | |
| 2004/0177765 A1 | 9/2004 | Halliday | |

(56) References Cited

U.S. PATENT DOCUMENTS

| | | |
|---|---|---|
| 2004/0180119 A1 | 9/2004 | Halliday et al. |
| 2004/0180123 A1 | 9/2004 | Halliday et al. |
| 2004/0182250 A1 | 9/2004 | Halliday et al. |
| 2004/0182251 A1 | 9/2004 | Halliday et al. |
| 2004/0187695 A1 | 9/2004 | Halliday et al. |
| 2004/0187696 A1 | 9/2004 | Halliday et al. |
| 2004/0188459 A1 | 9/2004 | Halliday et al. |
| 2004/0191370 A1 | 9/2004 | Halliday et al. |
| 2004/0191371 A1 | 9/2004 | Halliday et al. |
| 2004/0191372 A1 | 9/2004 | Halliday et al. |
| 2004/0197444 A1 | 10/2004 | Halliday et al. |
| 2004/0206245 A1 | 10/2004 | Halliday et al. |
| 2004/0208960 A1 | 10/2004 | Marshall |
| 2004/0211322 A1 | 10/2004 | Halliday et al. |
| 2004/0211742 A1 | 10/2004 | Deans |
| 2004/0250686 A1 | 12/2004 | Hale |
| 2005/0029287 A1 | 2/2005 | Mobbs |
| 2005/0034604 A1 | 2/2005 | Halliday et al. |
| 2005/0103204 A1 | 5/2005 | Halliday et al. |
| 2005/0150390 A1 | 7/2005 | Schifferle |
| 2005/0172822 A1 | 8/2005 | Macchi et al. |
| 2005/0183581 A1 | 8/2005 | Kirschner et al. |
| 2005/0223904 A1 | 10/2005 | Laigneau et al. |
| 2005/0266122 A1 | 12/2005 | Franceschi et al. |
| 2006/0000851 A1 | 1/2006 | Girard et al. |
| 2006/0065127 A1 | 3/2006 | Dalton et al. |
| 2006/0071000 A1 | 4/2006 | Weist et al. |
| 2006/0016347 A1 | 6/2006 | Girard et al. |
| 2006/0144242 A1 | 7/2006 | Mitchell et al. |
| 2006/0144244 A1 | 7/2006 | Girard et al. |
| 2006/0196363 A1 | 9/2006 | Rahn |
| 2006/0196364 A1 | 9/2006 | Kirschner |
| 2006/0236871 A1 | 10/2006 | Ternite et al. |
| 2006/0251771 A1 | 11/2006 | Yokota |
| 2006/0266222 A1 | 11/2006 | Hammad |
| 2006/0278093 A1 | 12/2006 | Biderman et al. |
| 2006/0280841 A1 | 12/2006 | Cai |
| 2006/0289316 A1 | 12/2006 | Henry |
| 2007/0012719 A1 | 1/2007 | Holler |
| 2007/0039479 A1 | 2/2007 | Dalton et al. |
| 2007/0039975 A1* | 2/2007 | Bochtler ............. B65D 71/502 222/142.5 |
| 2007/0059672 A1 | 3/2007 | Shaw et al. |
| 2007/0104837 A1 | 5/2007 | Yoakim et al. |
| 2007/0144356 A1 | 6/2007 | Rivera |
| 2007/0144357 A1 | 6/2007 | Rivera |
| 2007/0157821 A1 | 7/2007 | Panesar et al. |
| 2007/0158366 A1 | 7/2007 | Van Deer Meer et al. |
| 2007/0163446 A1 | 7/2007 | Halliday et al. |
| 2007/0175334 A1 | 8/2007 | Halliday et al. |
| 2007/0181005 A1 | 8/2007 | Kirschner et al. |
| 2007/0186784 A1 | 8/2007 | Liverani et al. |
| 2007/0209524 A1 | 9/2007 | Kim |
| 2007/0221066 A1 | 9/2007 | Sullivan et al. |
| 2007/0221069 A1 | 9/2007 | Rahn et al. |
| 2007/0259074 A1 | 11/2007 | Searchilli et al. |
| 2007/0288252 A1 | 12/2007 | Weinberg |
| 2007/0289453 A1 | 12/2007 | Halliday et al. |
| 2008/0028948 A1 | 2/2008 | Kirschner et al. |
| 2008/0029541 A1 | 2/2008 | Wallace et al. |
| 2008/0092747 A1 | 4/2008 | Yoakim et al. |
| 2008/0115675 A1 | 5/2008 | Suggi Liverani et al. |
| 2008/0116086 A1 | 5/2008 | Hung |
| 2008/0121111 A1 | 5/2008 | Paget et al. |
| 2008/0134901 A1 | 6/2008 | Cortese |
| 2008/0134902 A1 | 6/2008 | Zimmerman et al. |
| 2008/0135424 A1 | 6/2008 | Ostrowski |
| 2008/0148948 A1 | 6/2008 | Evers et al. |
| 2008/0149669 A1 | 6/2008 | Nicholson et al. |
| 2008/0156196 A1 | 7/2008 | Doglioni Majer |
| 2008/0160153 A1 | 7/2008 | Hestekin et al. |
| 2008/0173705 A1 | 7/2008 | Girard et al. |
| 2008/0210408 A1 | 9/2008 | Sterngold et al. |
| 2008/0230571 A1 | 9/2008 | Sterngold et al. |
| 2008/0319876 A1 | 12/2008 | Goldburt |
| 2009/0155422 A1 | 6/2009 | Ozanne |
| 2010/0025267 A1 | 2/2010 | Brand |
| 2010/0045705 A1 | 2/2010 | Vertegaal et al. |
| 2010/0107890 A1 | 5/2010 | Zanetti |
| 2010/0300913 A1 | 12/2010 | Goldburt |
| 2011/0166910 A1 | 7/2011 | Marina et al. |
| 2012/0040018 A1 | 2/2012 | Thierman et al. |
| 2012/0223100 A1 | 9/2012 | Simonian et al. |
| 2013/0140198 A1 | 6/2013 | Rohr et al. |
| 2013/0175236 A1 | 7/2013 | Boukobza et al. |
| 2013/0306642 A1 | 11/2013 | Dabah et al. |
| 2014/0224797 A1 | 8/2014 | Maloney et al. |
| 2014/0246342 A1* | 9/2014 | Domkowski ......... A61J 1/2089 206/222 |
| 2014/0311929 A1 | 10/2014 | Tickle et al. |
| 2014/0312065 A1 | 10/2014 | Rohr et al. |
| 2014/0360972 A1 | 12/2014 | Lane et al. |
| 2015/0021214 A1 | 1/2015 | Besic et al. |
| 2015/0136725 A1 | 5/2015 | Boukobza et al. |
| 2015/0166239 A1* | 6/2015 | Dabah .................... B65D 51/28 206/222 |
| 2015/0174542 A1 | 6/2015 | Lee et al. |
| 2015/0175337 A1 | 6/2015 | Lee |
| 2015/0183560 A1 | 7/2015 | Ginzburg et al. |
| 2015/0203254 A1 | 7/2015 | Lee et al. |
| 2015/0217913 A1 | 8/2015 | Midura |
| 2015/0251837 A1 | 9/2015 | Krammer |
| 2015/0291341 A1 | 10/2015 | Lott et al. |
| 2015/0336722 A1 | 11/2015 | Brook-Chrispin et al. |
| 2015/0344203 A1 | 12/2015 | Anderson |
| 2015/0344204 A1 | 12/2015 | Anderson |
| 2015/0360814 A1 | 12/2015 | Foster |
| 2016/0090222 A1 | 3/2016 | Lee |
| 2016/0096673 A1 | 4/2016 | Leibovitch |

FOREIGN PATENT DOCUMENTS

| | | |
|---|---|---|
| CN | 101862119 A | 10/2010 |
| EP | 0512470 A1 | 11/1992 |
| EP | 0905049 | 3/1999 |
| EP | 1440904 A1 | 7/2004 |
| EP | 1774878 A1 | 4/2007 |
| EP | 2 947 026 A1 | 11/2015 |
| FR | 2764868 | 12/1998 |
| FR | 2938243 A1 | 11/2008 |
| GB | 2335179 A | 9/1999 |
| JP | HEI 02-231043 | 9/1990 |
| JP | 2002/293332 A | 10/2002 |
| JP | 2004/054609 A | 2/2004 |
| JP | 2006/117305 A | 5/2006 |
| JP | 2006/188286 | 7/2006 |
| JP | 2007/275226 A | 10/2007 |
| JP | 2007/276787 A | 10/2007 |
| JP | 2009/018195 A | 1/2009 |
| JP | 2009/234656 A | 10/2009 |
| JP | 2010/0537916 | 9/2010 |
| JP | 2012/501281 A | 1/2012 |
| WO | WO 02/28241 A1 | 4/2002 |
| WO | WO 2005/077811 | 8/2005 |
| WO | 2006/004345 | 1/2006 |
| WO | WO 2006/062418 A1 | 6/2006 |
| WO | WO 2006/128695 | 12/2006 |
| WO | WO 2007/025773 | 3/2007 |
| WO | WO 2007/081210 A1 | 7/2007 |
| WO | 2009/057940 | 5/2009 |
| WO | WO 2009/082198 A1 | 7/2009 |
| WO | WO 2010/025392 A2 | 3/2010 |
| WO | WO 2011/089049 A1 | 7/2011 |
| WO | WO 2012/045116 A1 | 4/2012 |
| WO | WO 2012/171529 A1 | 12/2012 |
| WO | WO 2013/119088 A2 | 8/2013 |
| WO | WO 2013/124553 A2 | 8/2013 |
| WO | WO 2014/027830 A2 | 2/2014 |
| WO | WO 2014/115111 A2 | 7/2014 |
| WO | WO 2015/173661 A1 | 11/2015 |
| WO | WO 2015/177167 A1 | 11/2015 |

(56) References Cited

OTHER PUBLICATIONS

Extended European Search Report for European Application No. , European Patent Office, dated Dec. 12, 2019, 6 pages.

* cited by examiner

BEVERAGE SYSTEM INCLUDING A REMOVABLE PIERCER

BACKGROUND

Field of the Invention

The present invention relates generally to beverage dispensers and more particularly to post-mix beverage systems.

Background Art

Beverages are often marketed, delivered and sold in a variety of different types of containers.

SUMMARY

The following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

Aspects of the disclosure include a piercing apparatus for a beverage container. The piercing apparatus includes an inner ring composed of a rigid material and an outer ring composed of a flexible material that encompasses the inner ring. The outer ring has an upper portion disposed above the inner ring that has a greater range of motion than the outer ring that encompasses the inner ring. The piercing apparatus further includes a piercer composed of a rigid material that is connected to the inner ring by a plurality of arms that radially extend from the piercer to the inner ring. The plurality of arms define a plurality of openings between the arms. The outer ring includes a protrusion that circumferentially protrudes outward from an outer surface of the outer ring.

In another aspect of the disclosure, a beverage system is provided with a container and a piercing apparatus detachably attachable into a neck of the container, the piercing apparatus having a piercer composed of a rigid material located in a center of the piercing apparatus, and when attached to the neck of the container the piercing apparatus is located in the center of the neck of the container. A neck cover that attaches to an outer rim of the neck of the container, wherein the neck cover defines an upper opening, a cap that seals the upper opening on the neck cover, and a strap that connects the neck portion to the cap.

In another aspect of the disclosure, a beverage system is provided with a container a neck cover that attaches to an outer rim of a neck of the container, wherein the neck cover defines an upper opening, a cap that seals the opening on the neck cover, and a strap with a first end and a second end, the first end is attachably detachable to the cap and the second end is attachably detachable to the neck cover. The connection of the first end of the strap to the cap enables the cap to rotate freely about the first end of the strap. The second end of the strap has a connector that corresponds to a connection component of the neck cover. Further the connection and disconnection of the second end of the strap to the neck component is only enabled when the neck cover is not attached to the outer rim of the neck of the container.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

Figure 1:
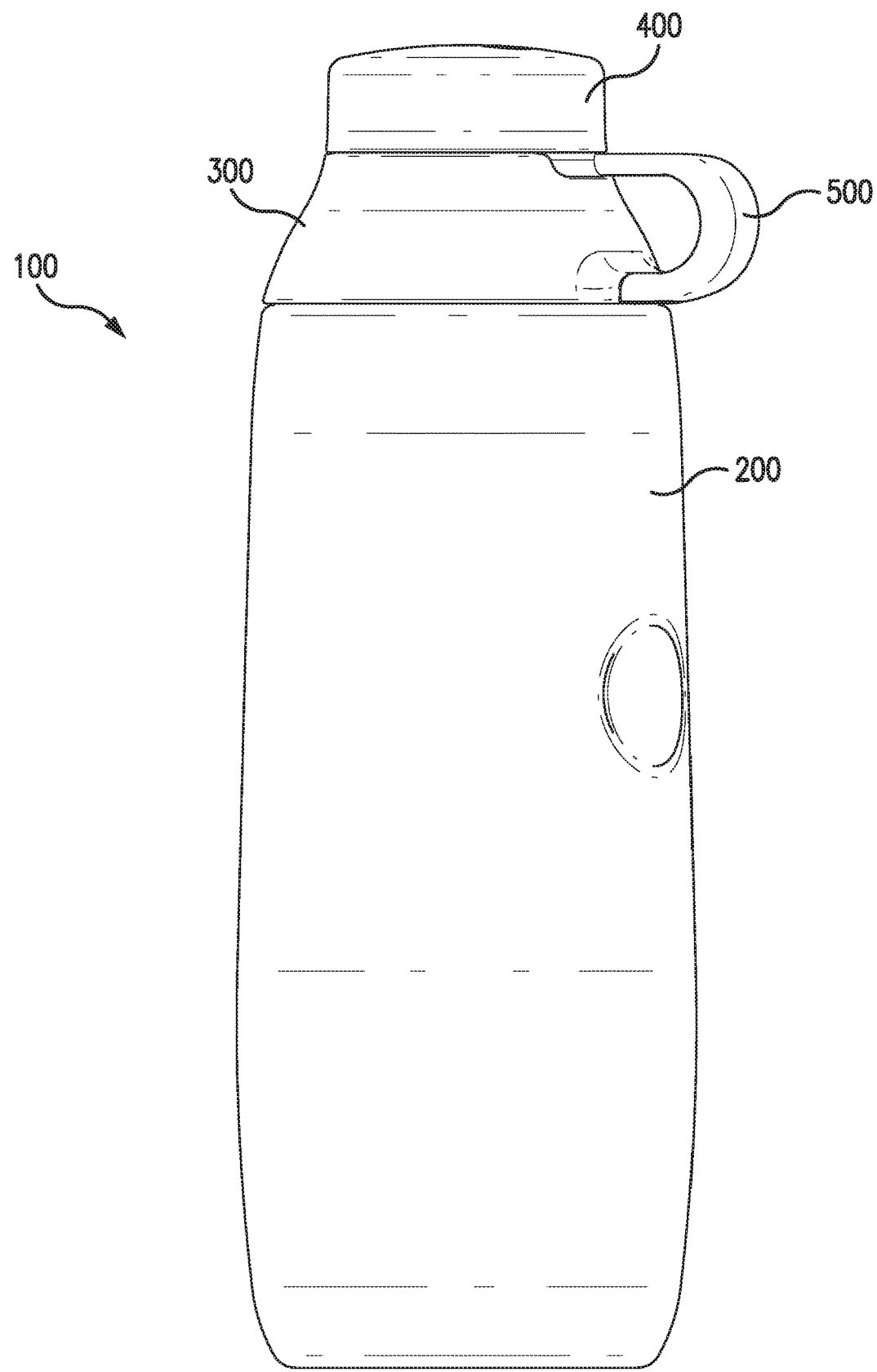
FIG. 1 illustrates a side view of an embodiment of a beverage system in accordance with aspects of the present disclosure.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized and structural and functional modifications may be made, without departing from the scope of the present disclosure.

The type of container used for a beverage may depend on several factors, including for example, the consumer for which the beverage is being marketed towards, the distribution channel(s), and/or the quantity of beverage being sold. In this regard, beverages marketed towards consumers may be distributed in plastic bottles. Such bottles take up valuable space and other resources, for example in transit, in the retail environment and at end-users' locations, such as their homes. Some systems may address some of these drawbacks by selling concentrated beverage syrups designed to be diluted with liquid, such as water. They may reduce waste associated with other delivery mechanisms, such as plastic bottles, but they require large, expensive systems that are too complicated and cumbersome for use by consumers other than retail establishments that sell large quantities of beverages. Even for such establishments, the knowledge and costs required to maintain conventional post-mix systems is inconvenient. They may require calibration on a regular basis to ensure that the correct amount of syrup is properly combined with the liquid. Any miscalibration or failure of the machine is often only discovered after customers complain about the taste of the beverage and further time is required to check and fix the ratio of syrup to liquid.

FIGS. 1-4 illustrate an example of a post-mix beverage system 100. In some embodiments the system includes a container or bottle 200, a neck cover 300, a cap 400, a strap 500 that connects cap 400 and neck cover 300, and a piercing apparatus 600. Container 200 may hold a mixing solution or liquid, such as water, to be mixed with the contents of a cartridge 700 (see, e.g., FIG. 5) in order to create a desired beverage in container 200. Container 200 may generally be in the shape of a bottle, however, the present disclosure is not so limited and the container may have a variety of other shapes. Beverage system 100 and cartridge 700, along with their component elements, may have the features of similar elements described in U.S. patent application Ser. No. 13/342,550 filed Jan. 3, 2012, titled Post-mix beverage system, which is incorporated herein in its entirety by reference thereto.

Figure 2:
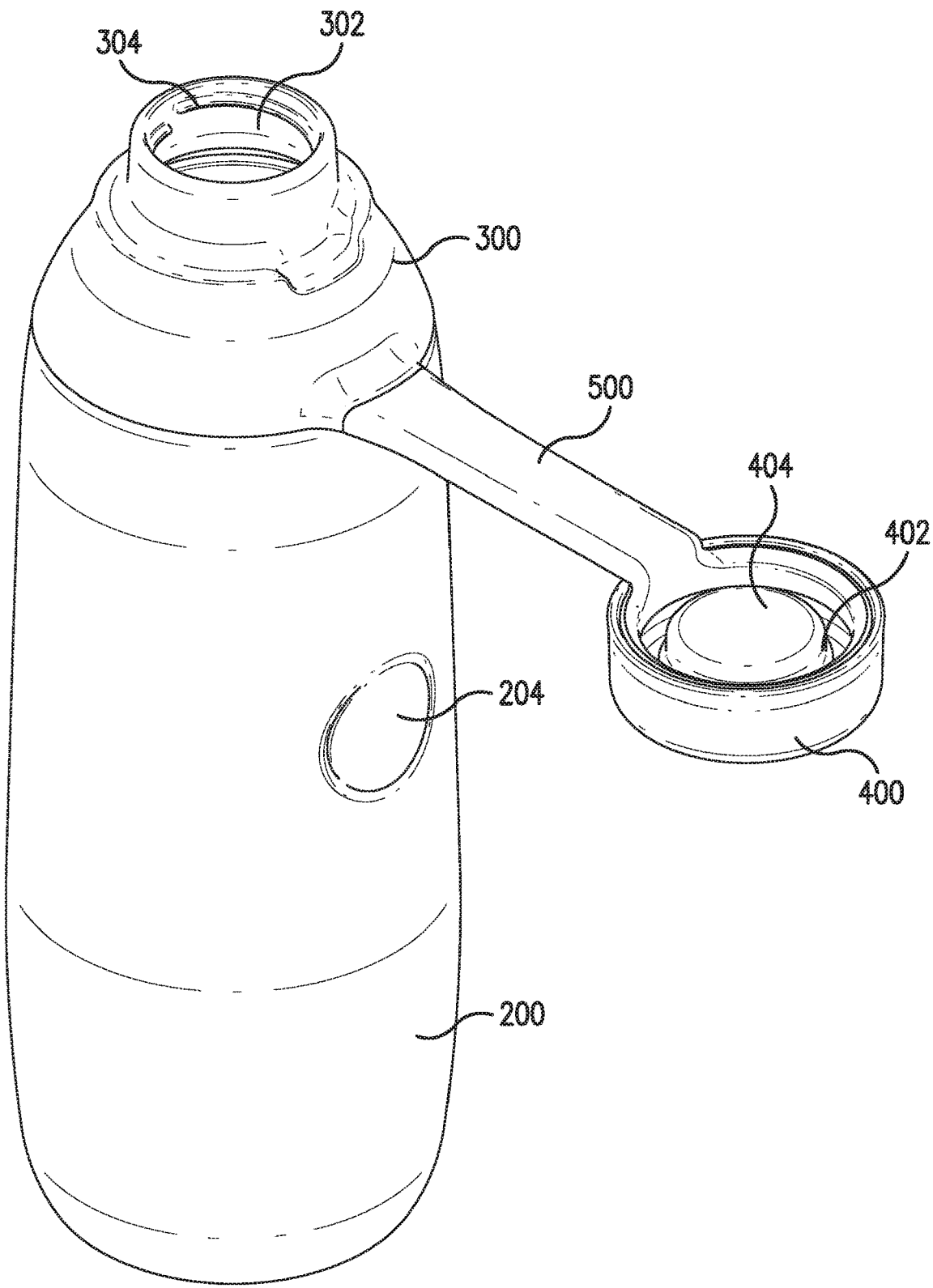
FIG. 2 illustrates a perspective view of an embodiment of a beverage system with an open cap in accordance with aspects of the present disclosure.

In some embodiments, cap 400 may be removed from neck cover 300 (see FIG. 2). Neck cover 300 defines an opening 302 that is defined at the upper end of neck cover 300. A user may drink the beverage from container 200 through opening 302 of neck cover 300. When cap 400 is attached to neck cover 300, cap 400 seals opening 302, thus preventing the beverage inside the container from leaking or spilling. The sealing between cap 400 and neck cover 300 may be accomplished in a variety of different manners. For example, neck cover 300 may have screw threads 304 within opening 302 and cap 400 may have corresponding screw threads 402 on a projection 404 within cap 400.

Cap 400 may be secured to container 200 when cap 400 is removed from neck cover 300 by way of a magnet 406 (see FIG. 8) that is embedded within a projection 404 of cap 400. Container 200 may include a corresponding magnet or metallic insert 204 that is secured to container 200. When cap 400 is removed from neck cover 300, the location of magnet or metallic insert 204 and magnet 406 in cap 400 are aligned to enable cap 400 to be secured to the container 200 by magnetic attraction between magnet or metallic insert 204 and magnet 406. By securing cap 400 to container 200, cap 400 does not flop around during use by the user.

Figure 3:
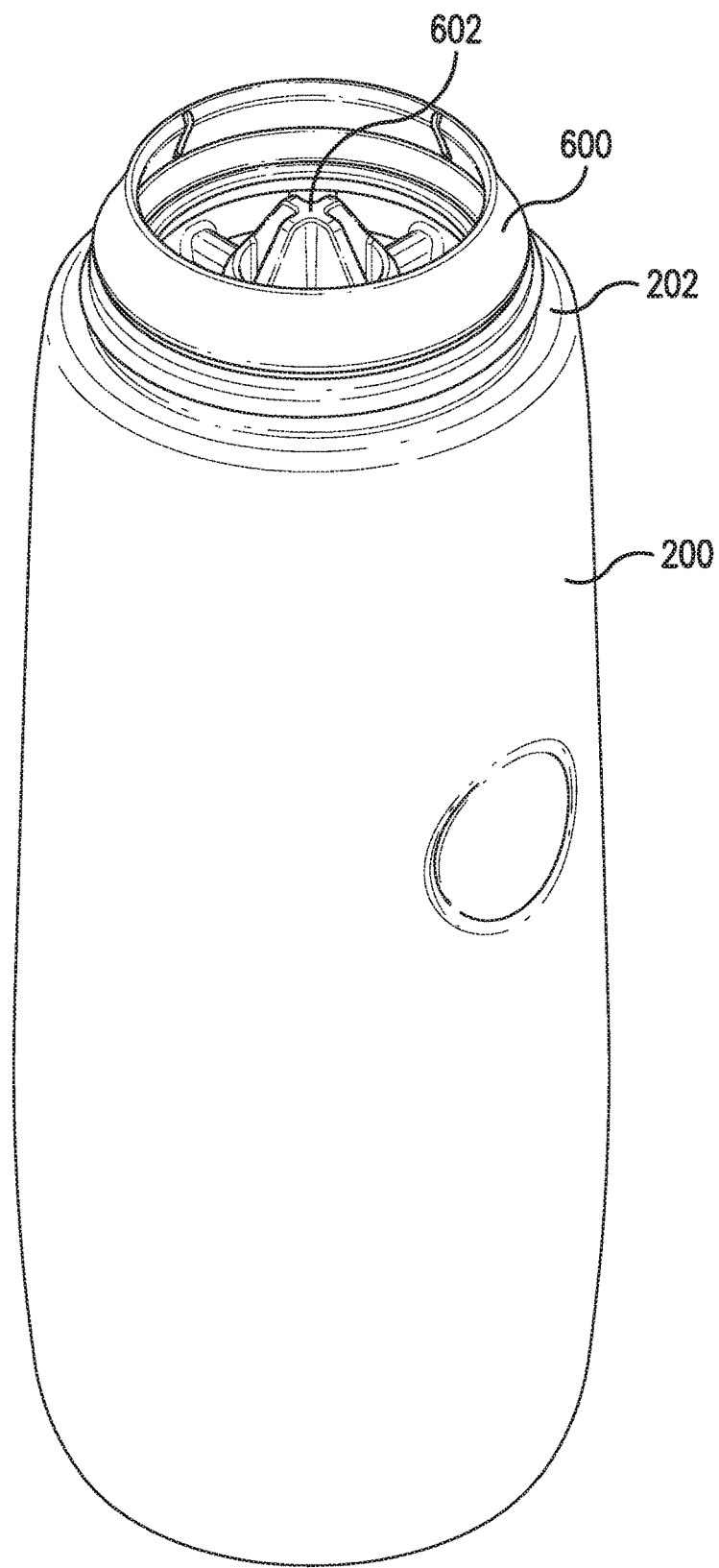
FIG. 3 illustrates a perspective view of an embodiment of a beverage system with a neck cover removed and illustrating a piercing apparatus.

Neck cover 300 may be removed from container 200 (see FIG. 3, which illustrates a perspective view of an exemplary embodiment of beverage system 100 in which neck cover 300 is removed from container 200). When neck cover 300 is removed from container 200, its attached cap 400 and strap 500 are also removed. The attachment of neck cover 300 and container 200 may be accomplished in a variety of different manners. For example, a neck 202 of container 200 may include screw threads which correspond to screw threads located within neck cover 300.

In some embodiments, a piercing apparatus 600 may be secured in neck 202 of container 200. Piercing apparatus 600 may easily be inserted and removed from neck 202 of container 200. Piercing apparatus 600 may be removed from container 200 to facilitate ease of use of beverage system 100. For example, piercing apparatus 600 is removable in order to allow ease of cleaning piercing apparatus 600, or for using piercing apparatus 600 independently of container 200 (e.g., with a different container). Each component of beverage system 100 is composed of a material that is dishwasher safe, thereby enabling the user to wash the components in the dishwasher. Also, since piercing apparatus 600 is removable, it may be used independently of container 200, for example piercing apparatus 600 may be used with one or more different containers. Thus piercing apparatus 600 may be interchangeable with a number of different containers.

Figure 4:
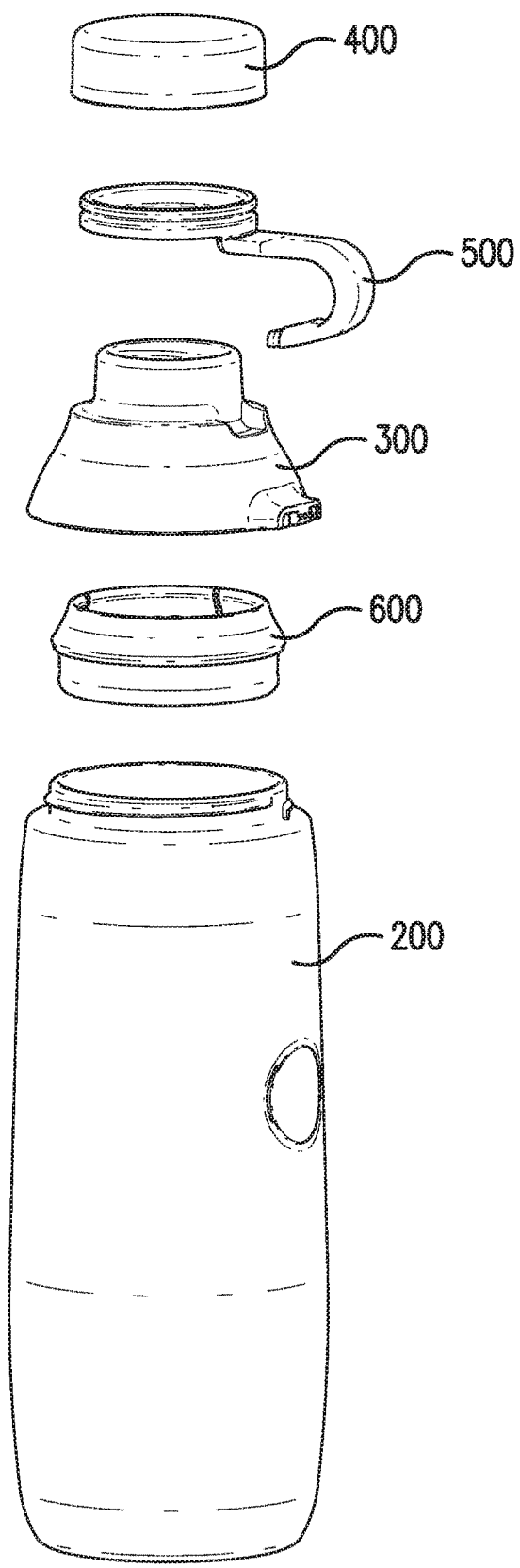
FIG. 4 illustrates an exploded view of an embodiment of a beverage system.

FIG. 4 illustrates an exploded view of an exemplary embodiment of beverage system 100 and how the various components of beverage system 100 interact with each other. In some embodiments, piercing apparatus 600 is inserted into neck 202 of container 200 to sealably engage therewith about an exterior side of piercing apparatus 600. After piercing apparatus 600 is inserted into and engaged with the neck 202 of container 200, neck cover 300 may be attached to container 200. Strap 500 may be attached to cap 400 and neck cover 300, and cap 400 may be attached to neck cover 300.

Figure 5:
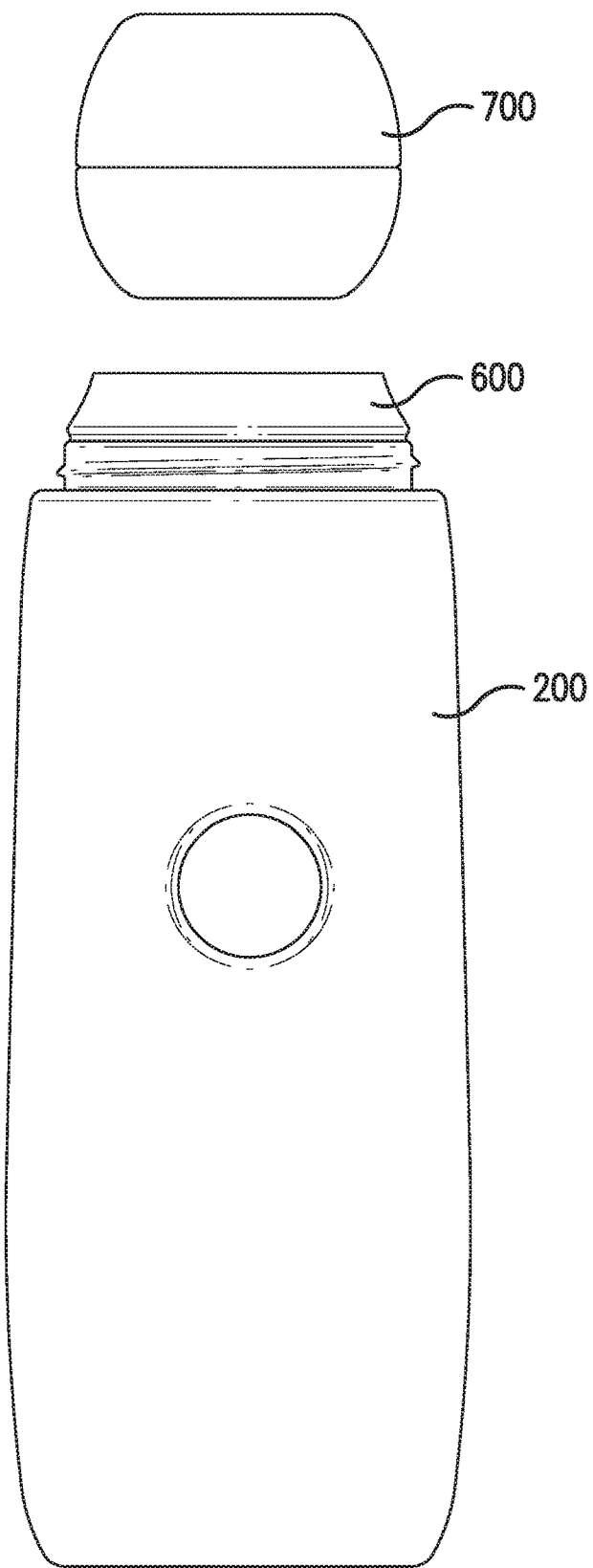
FIG. 5 illustrates an embodiment of a beverage system with a neck cover removed from the container and a cartridge.

In some embodiments, piercing apparatus 600 includes a piercer 602 for engaging with cartridge 700 and opening cartridge 700 to release contents of cartridge 700 into container 200. FIG. 5 illustrates container 200 with piercing apparatus 600 inserted into container 200 and cartridge 700 located above container 200. The cartridge 700 may hold one or more beverage ingredients, which may be, for example, syrup, paste, powder, granules, or other compositions, or any other combination of ingredients. Additionally, cartridge 700 may hold other ingredients or flavors, such as nutrients or vitamins. The contents of cartridge 700 may be mixed with contents of container 200, such as water.

Figure 6:
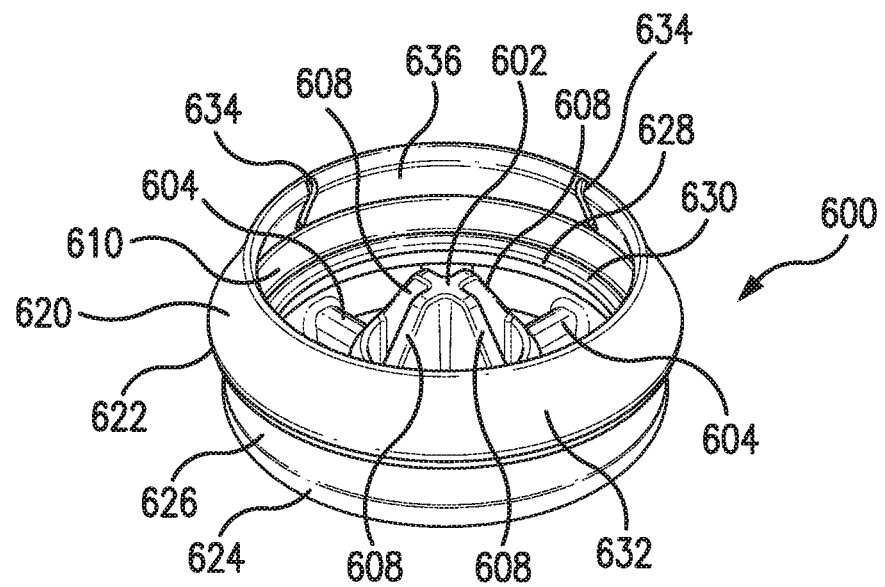
FIG. 6 illustrates a top perspective view of an embodiment of a piercing apparatus in accordance with aspects of the present disclosure.
Figure 7:
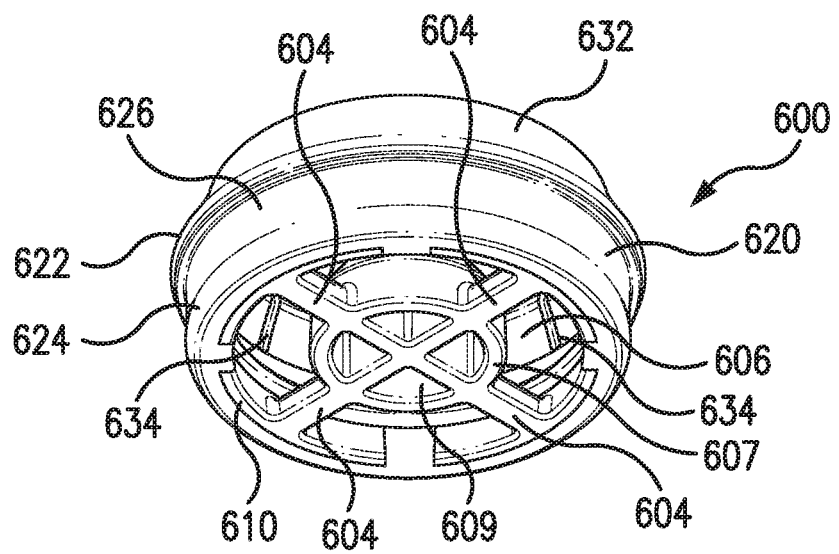
FIG. 7 illustrates a bottom perspective view of an embodiment of a piercing apparatus in accordance with aspects of the present disclosure.
Figure 8:
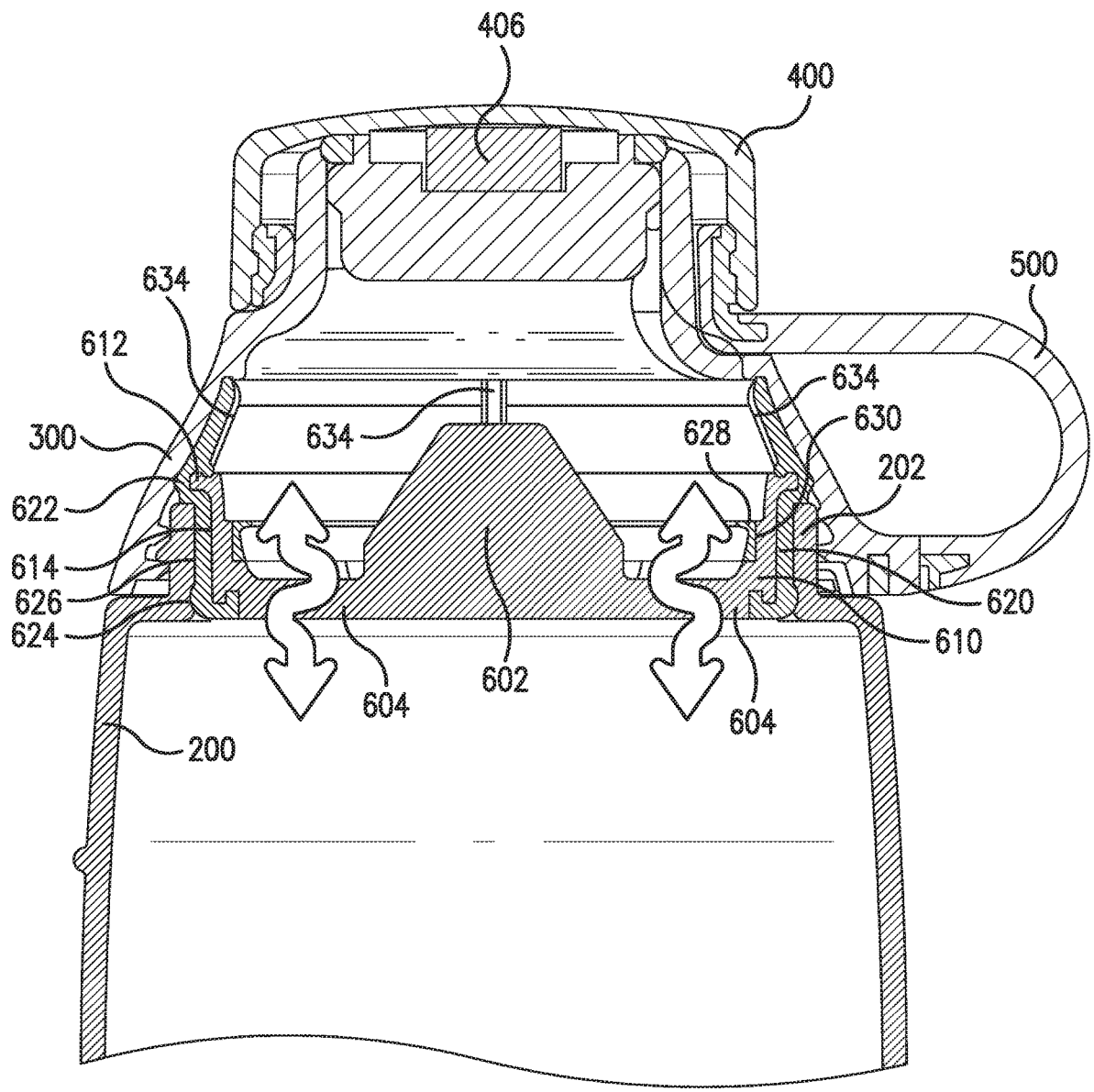
FIG. 8 illustrates a cross-sectional view of an upper portion of a beverage system with piercing apparatus inserted the container.

FIGS. 6 and 7 illustrate a top perspective view and a bottom perspective view of piercing apparatus 600, respectively, and illustrate further details of piercing apparatus 600. FIG. 8 illustrates a cross-sectional view of an upper portion of beverage system 100. In some embodiments piercing apparatus 600 includes a piercer 602 that is adapted to engage with cartridge 700 to release contents of cartridge 700 into container 200 by opening cartridge 700. Piercer 602 may be fabricated from a rigid material to enable piercer 602 to open cartridge 700. For example, piercer 602 may be made of a hard thermoplastic polymer, such as, for example, polybutylene terephthalate (PBT) or acrylonitrile butadiene styrene (ABS).

In some embodiments piercer 602 may be centered in the middle of piercing apparatus 600, and when piercing apparatus 600 is inserted into neck 202 of the container 200, piercer 602 is centered in neck 202 of container 200. Piercer 602 may have a variety of different shapes to engage with cartridge 700.

Piercing apparatus 600 may include an inner ring 610, which in some embodiments is fabricated from a rigid material. For example, inner ring 610 may be made of a hard thermoplastic polymer, such as, for example, PBT or ABS. In some embodiments, inner ring 610 is made of the same material as piercer 602.

Piercing apparatus 600 may include an outer ring 620 that is fabricated from a flexible material. For example, outer ring 620 may be made of a flexible synthetic polymer such as silicone. Outer ring 620 may encompass portions of inner ring 610, but may leave other portions of inner ring 610 exposed. For example, an inner surface of the inner ring 610 above an inner rib 628, discussed below, may be exposed. Alternatively, the entire inner ring 610 may be completely encompassed by the outer ring 620.

Inner ring 610 and outer ring 620 may be manufactured to be one integral component. While made of different materials, in some embodiments inner ring 610 and outer ring 620 are not separable after their manufacture (e.g., inner ring 610 and outer ring 620 cannot be separated by the user). The piercing apparatus 600 may be manufactured by molding (including co-molding), casting, machining, 3-D printing or combinations of these and similar techniques.

In some embodiments piercer 602 is connected to inner ring 610 by a plurality of arms 604. Arms 604 may be monolithic with the inner ring 610 or otherwise integrally attached to the inner ring 610. The number of arms 604 that connect piercer 602 to inner ring 610 may vary. In some embodiments, the number of arms is four, which secures the piercer 602 to the inner ring 610 and contributes to the structural integrity of piercing apparatus 600 by helping support and maintain the shape of inner ring 610. Arms 604 may be spaced an equal distance apart (e.g., forming a cross). However, the present disclosure is not so limited to the illustrated embodiment and the number of arms 604 and the spacing of arms 604 may be varied. For example, arms 604 may also be intermediately spaced in a number of different patterns in order to provide structural integrity to piercing apparatus 600.

In some embodiments, arms 604 define openings 606 between adjacent arms 604. Openings 606 enable liquid or other beverage ingredients that are within cartridge 700 to flow into container 200 once cartridge 700 has been opened (e.g., by piercer 602). The flow of liquid can also be reversed. For example, the liquid within the container 200 (e.g., a beverage that may have been created with beverage ingredients from cartridge 700) can flow from container 200 through openings 606 to opening 302 of neck cover 300 to enable the user to drink from container 200. This bi-directional flow is illustrated by the bi-directional arrows shown in FIG. 8.

Piercer 602 may have a variety of different shapes to engage with cartridge 700. According to some embodiments, piercer 602 may have plurality of vertical members 608 (e.g., each vertical member 608 aligning with an arm 604). Alternatively, vertical members 608 may be offset from arms 604. In some embodiments, each vertical member 608 connects to the others at the center of piercing apparatus 600, thus providing a contact point to contact cartridge 700. In some embodiments, piercer 602 is surrounded by a base ring 607 to which arms 604 are attached to connect piercer 602 to inner ring 610. Vertical members 608 may extend above base ring 607 but may not extend beyond an upper edge of a cartridge retainer 632 of piercing apparatus 600 which enables cartridge 700 to be inserted and secured by piercing apparatus 600 before piercer 602 opens cartridge 700.

The number of vertical members 608 may vary. For example, in some embodiments there may be four vertical members 608 that are equally spaced from each other and align with a corresponding arm 604 to connect to the inner ring 610, thus creating a cross.

Further, in some embodiments piercer 602 may define openings 609 between adjacent vertical members 608. The flow of the liquid through openings 609 of vertical members 608 may also be bi-directional, similar to openings 606 located between arms 604

Inner ring 610 may further include a lip 612 that projects from an outer surface 614 of inner ring 610. Lip 612 may be encompassed by outer ring 620. FIG. 8 illustrates lip 612 protruding from a top of inner ring 610, and also shows outer ring 620 encompassing lip 612, forming a lip 622 on outer ring 620. Lip 622 interacts with neck 202 of container 200 to secure piercing apparatus 600 in neck 202 of container 200 and to help keep piecing apparatus 600 from completely entering the container 200.

In some embodiments outer ring 620 may further include a rib 624 that protrudes circumferentially from an outer surface 626 of the outer ring 620. Rib 624 may seal piercing apparatus 600 to neck 202 of container 200 when piercing apparatus 600 is inserted in neck 202 of container 200, thus allowing liquid to flow only through openings 606 and 609, not between neck 202 and rib 624. FIG. 8 illustrates that when piercing apparatus 600 is inserted in neck 202 of the container 200, rib 624 is compressed against neck 202 of container 200, in a press-fit configuration.

In some embodiments outer ring 620 further includes inner rib 628 that protrudes circumferentially from an inner surface 630 of outer ring 620 toward piercer 602.

Figure 10:
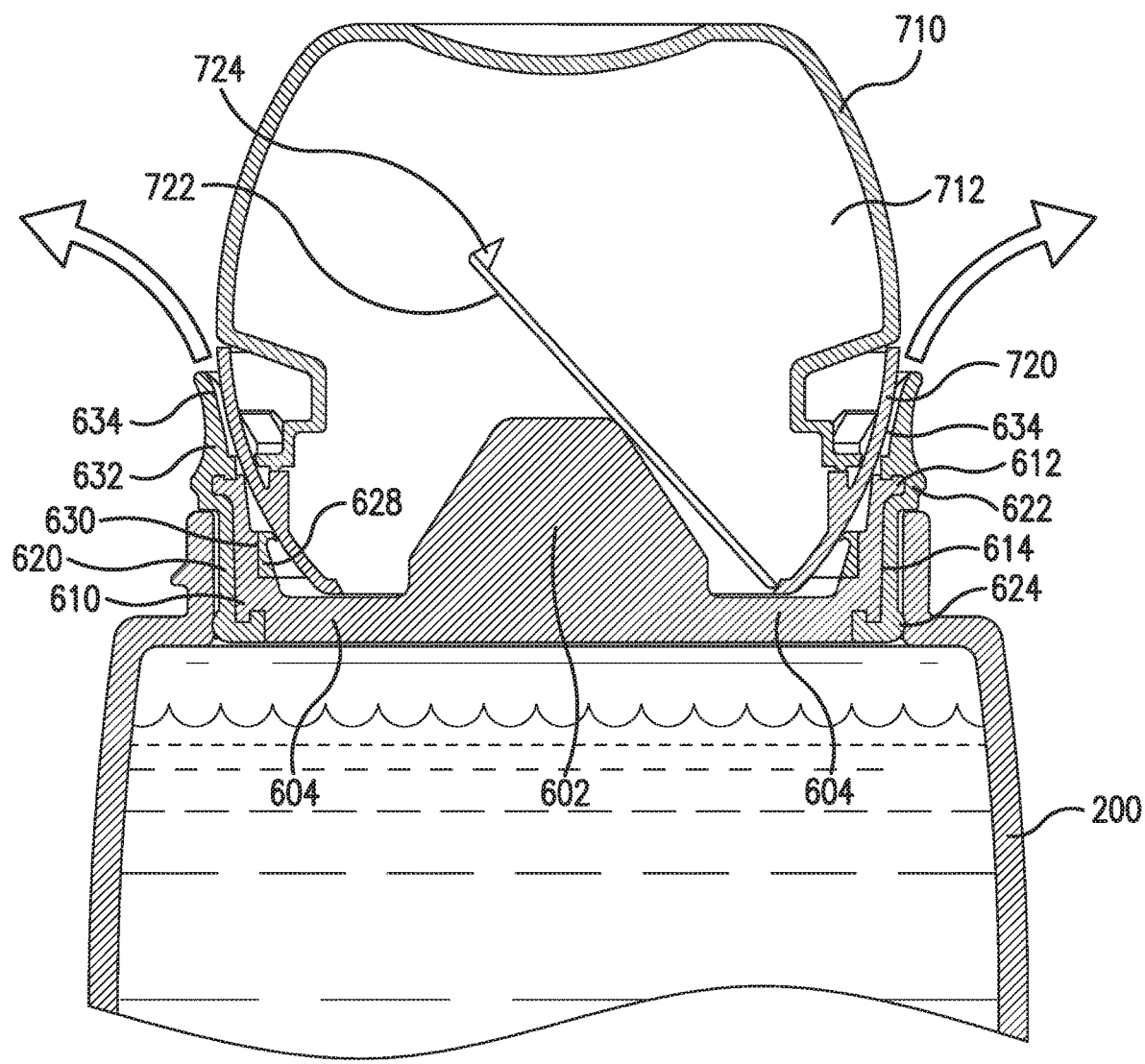
FIG. 10 illustrates a cross-sectional view of an upper portion of a beverage system with a cartridge inserted into a piercing apparatus.

In some embodiments outer ring 620 further includes a cartridge retainer 632. Cartridge retainer 632 may be disposed above inner ring 610. Cartridge retainer 632 may extend vertically at an inward angle from the top of inner ring 610. In some embodiments cartridge retainer 632 does not encompass any portion of inner ring 610 or any other rigid material. By not encompassing rigid material, cartridge retainer 632 has greater flexibility than the rest of outer ring 620 that encompasses inner ring 610. This flexibility enables cartridge retainer 632 to have a greater range of motion than the rest of outer ring 620. For example, cartridge retainer 632 may flex outward, away from piercer 602. In some embodiments cartridge retainer 632 secures cartridge 700 in place by flexing outward when cartridge 700 is inserted into piercing apparatus 600. As illustrated in FIG. 10, inner rib 628 and cartridge retainer 632 seal cartridge 700 that is inserted into piercing apparatus 600 to ensure that liquid does not flow outside container 200 and cartridge 700.

In some embodiments cartridge retainer 632 further includes a plurality of vertical slots 634 that are positioned on an inner surface 636 of cartridge retainer 632. Slots 634 may extend from substantially the bottom of inner surface 636 to the top of inner surface 636 of cartridge retainer 632. In some embodiments, the number of slots 634 is four and slots 634 are equally spaced form each other. However, the present disclosure is not so limited. The number of slots 634 and the spacing between slots 634 in cartridge retainer 632 may be varied. In some embodiments, slots 634 may be located directly above arms 604 that secure piercer 602 to inner ring 610.

Figure 9:
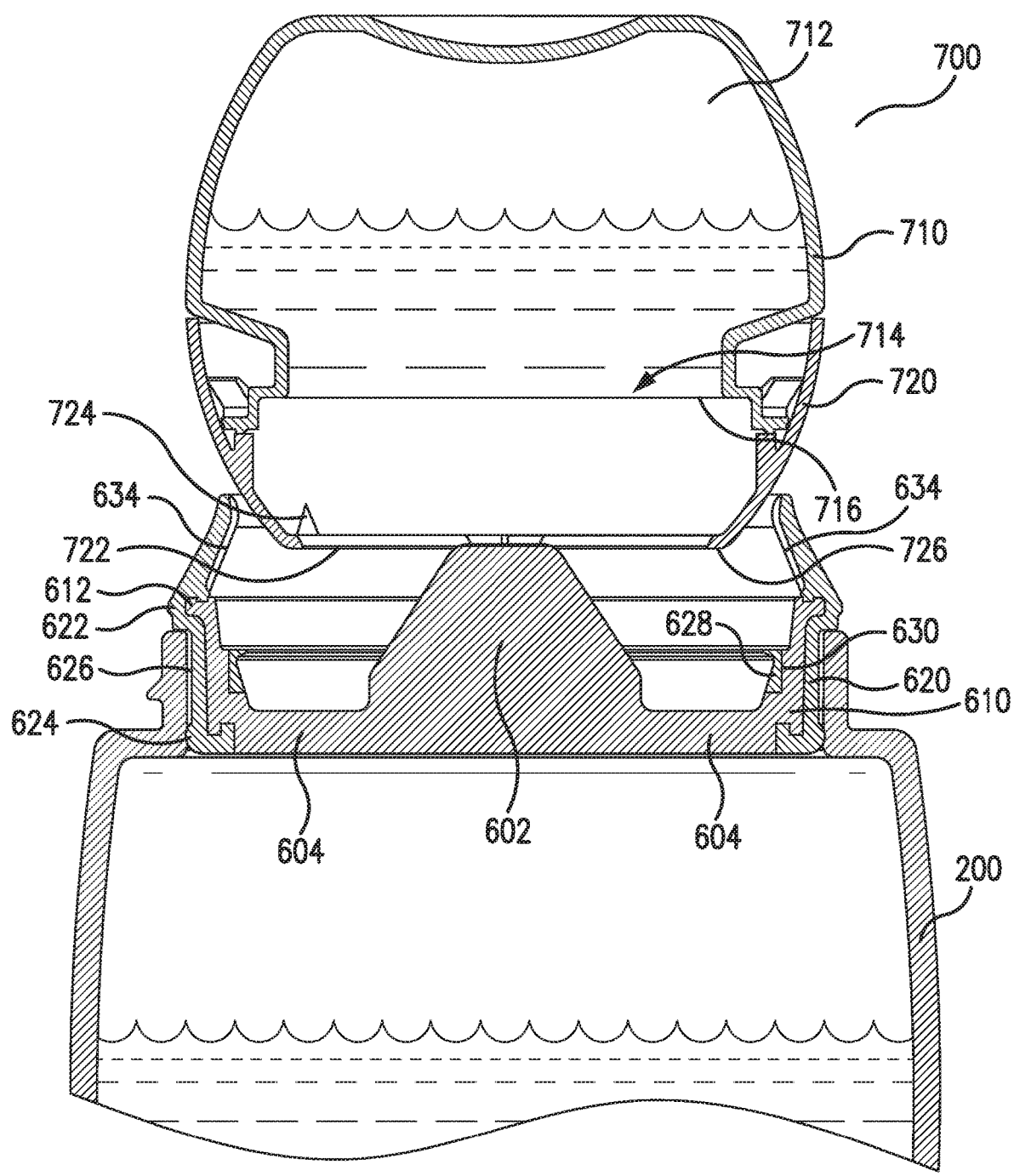
FIG. 9 illustrates a cross-sectional view of an upper portion of a beverage system with a cartridge about to be inserted into a piercing apparatus.

FIGS. 9 and 10 illustrate an exemplary process of mixing the contents of cartridge 700 with the contents of container 200. Cartridge 700 may engage with piercing apparatus 600 by a user inserting cartridge 700 into piercing apparatus 600 when neck cover 300 is removed from container 200. Cartridge 700 may include a pod 710 and a cap 720 which are connected to each other. The connection between pod 710 and cap 720 may, for example, use a snap structure, corresponding threads, or other connection mechanism. Cartridge 700 may hold one or more beverage ingredients, which may be, for example, syrup, paste, powder, granules, or other compositions, or any other combination of ingredients. Additionally, cartridge 700 may hold other ingredients or flavors, such as nutrients or vitamins.

Pod 710 may be a vessel capable of holding the syrup, paste, powder, granules, or other compositions, or combination of ingredients. Pod 710 may have a circular cross-section and may include a chamber 712, an opening 714, and a cover 716. Cover 716 may be located over opening 714 of pod 710. Cover 716 may be a seal sealing in contents of cartridge 700. For example, cover 716 may be a foil seal located over opening 714 of pod 710.

In some embodiments cap 720 includes a lid 722 with teeth 724. Lid 722 may be attached to cap 720 by a hinge 726 that enables lid 722 to rotate about hinge 726 to cause teeth 724 on lid 722 to open cover 716 of pod 710 (e.g., by tearing through or otherwise puncturing cover 716).

When lid 722 of the cap 720 is pressed against piercer 602 with a sufficient force, piercer breaks lid 722 free from the rest of cap 720 except for at its connection to the rest of cap 720 at hinge 726. Lid 722 rotates about hinge 726 and teeth 724 of the lid 722 open cover 716 of pod 710, thereby releasing the contents of cartridge 700 into the contents of container 200, where they mix together to form a beverage. The contents of cartridge 700 pass through openings 606 and 609. While cartridge 700 is inserted into piercing apparatus 600, cartridge retainer 632 flexes outward to grip and provide inward force to secure cartridge 700 in piercing apparatus 600. In addition, when cartridge 700 is inserted into piercing apparatus 600, air from inside container 200 is released by way of vertical slots 634 that are positioned on inner surface 636 of cartridge retainer 632. This release of air is illustrated by the arrows in FIG. 10. Releasing air through slots 634 inhibits a pressure build-up that could otherwise occur as cartridge 700 is forced downward by a user within piercing apparatus 600. This pressure build-up could cause cartridge 700 to pop off of piercing apparatus, thus reducing the effectiveness of the seal therebetween. If the pressure buildup was overcome (e.g., by "burping" air past cartridge retainer 632), cartridge 700 could become stuck on piercing apparatus 600 by suction between cartridge 700 and container 200. Slots 634 relieve any pressure differences by allowing airflow with the outside atmosphere. This promotes easy insertion and removal of cartridge 700 into and from piercing apparatus 600.

After the contents of cartridge 700 are released into container 200 and while cartridge 700 is secured to the piercing apparatus 600, the user may mix the contents of container 200 and the contents formerly inside cartridge 700. This helps wash out the cartridge 700 and help ensure that cartridge 700 is empty. Cartridge 700 may then be removed from piercing apparatus 600 and the user may reattach neck cover 300 to neck 202 of container 200. The user may further mix the contents of container 200 and the contents formerly of cartridge 700 by shaking container 200. After the beverage is mixed, the user may remove cap 400 and drink the mixed beverage.

Piercing apparatus 600 may be used independently of container 200 and other elements of beverage system 100. For example, piercing apparatus 600 may be used with a cartridge 700 in the same manner as described above to release the contents of cartridge 700 into any other sort of container, such as a cup of water or a general-purpose water bottle. In this way a user can easily take just piercing apparatus 600 and a cartridge 700 on the go (e.g., in a user's pocket), and can acquire a cup and water at any desired location to conveniently create their preferred beverage in the manner described above.

Figure 11:
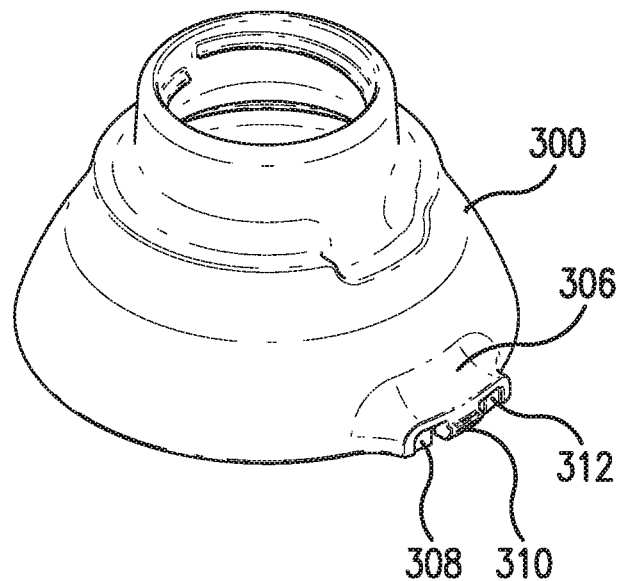
FIG. 11 illustrates a top perspective view of a neck cover of a beverage system.
Figure 12:
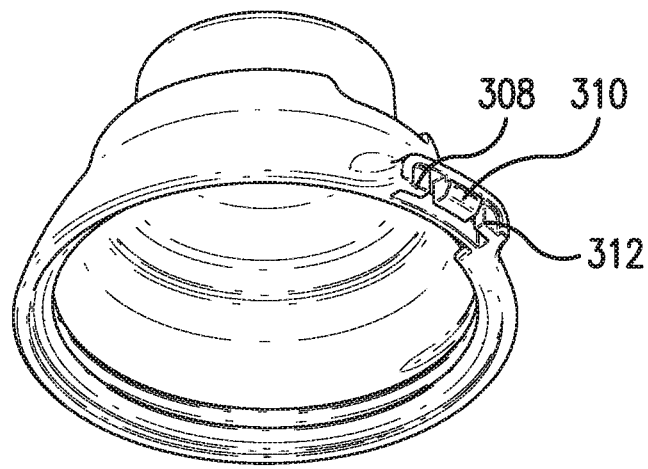
FIG. 12 illustrates a bottom perspective view of a neck cover for a beverage system.
Figure 13:
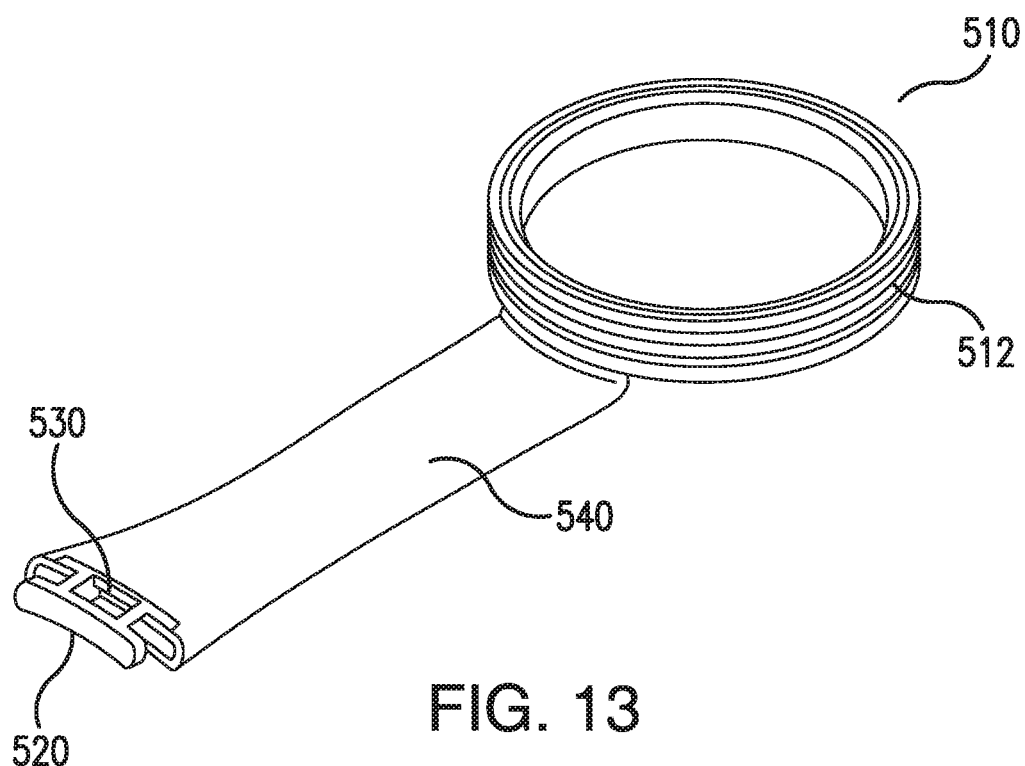
FIG. 13 illustrates a perspective view of a strap for a beverage system.
Figure 14:
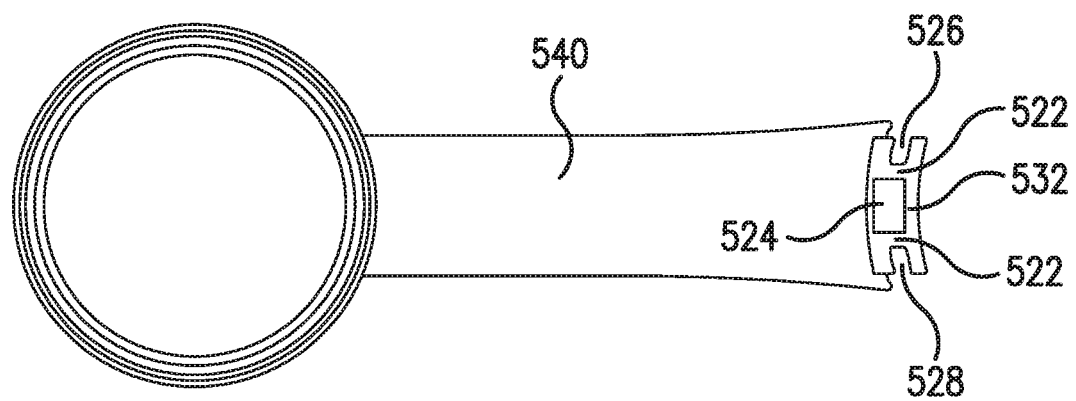
FIG. 14 illustrates a top view of a strap for a beverage system.
Figure 15:
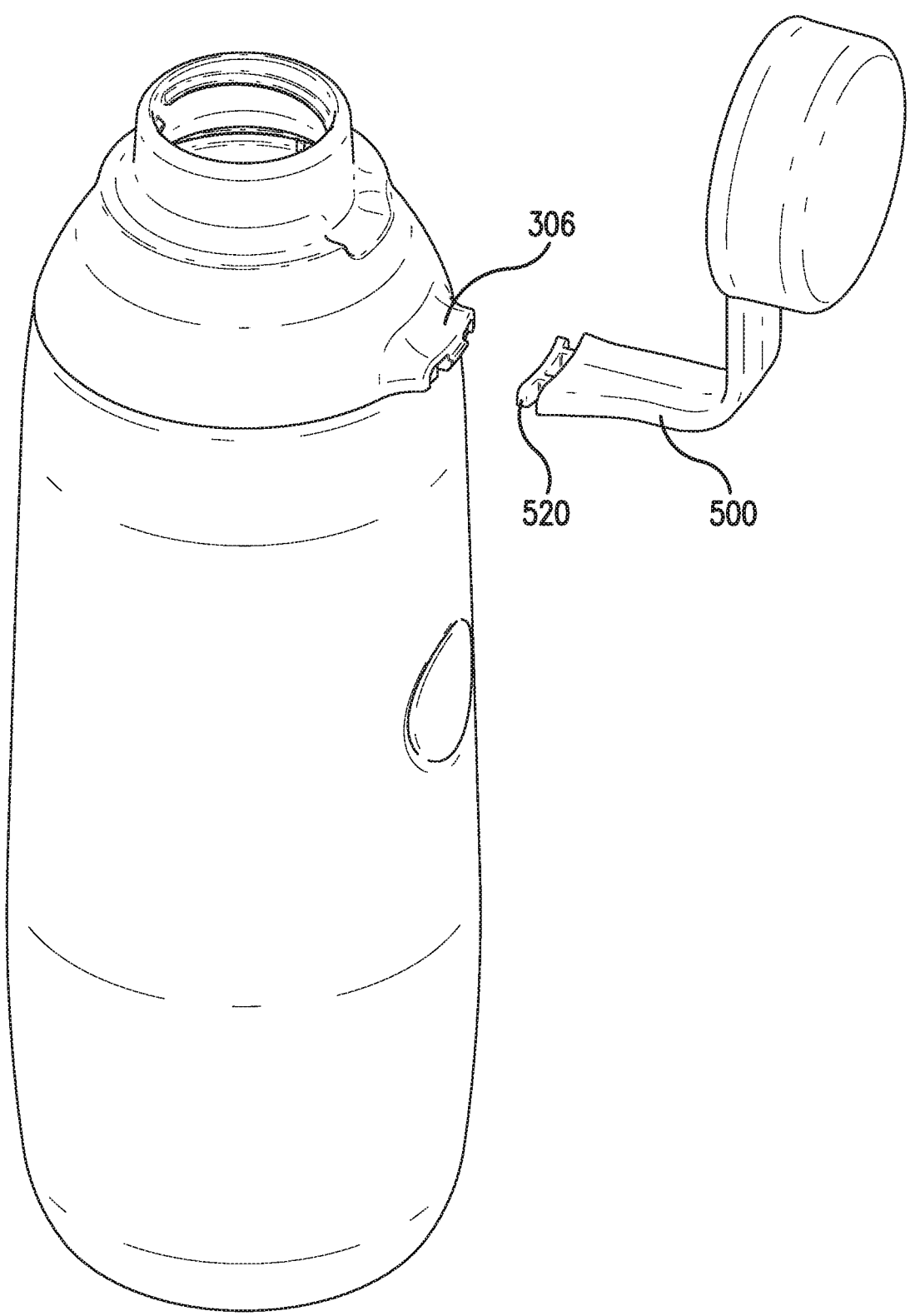
FIG. 15 illustrates a perspective view of a beverage system with a strap disconnected from a neck cover.

FIGS. 11 and 12 illustrate neck cover 300. Neck cover 300 is a separate component from cap 400 and strap 500. FIGS. 13 and 14 illustrate strap 500. Strap 500 may be attached to neck cover 300 and cap 400. Strap 500 includes a first end 510, a second end 520, and a middle portion 540. First end 510 and second end 520 are composed of a rigid material such as a hard thermoplastic polymer, for example, PBT or ABS. The middle portion 540 is composed of a flexible material such as a flexible synthetic polymer, for example, silicone.

A ring 512 is disposed at first end 510. Ring 512 is not separable from the rest of strap 500. Ring 512 snaps into cap 400 (e.g., within an interior recess of a sidewall of cap 400) and enables cap 400 to freely rotate about ring 512 of strap 500. In this manner, when cap 400 is attached to neck cover 300, cap 400 may be twisted onto neck cover 300 without rotating strap 500.

Two legs 522 are disposed at second end 520. Legs 522 may connect to a lateral bridge piece 532 that extends laterally beyond both legs 522. The legs 522 and lateral bridge piece 532 define a central opening 524 and opposing side notches 526 and 528. A snap-fit protrusion 530 protrudes from the inner surface of the second end 520 into the opening 524.

In some embodiments neck cover 300 includes a strap connector 306. Strap connector 306 may be a snap-fit type connector that connects second end 520 of strap 500 to neck cover 300. In some embodiments strap connector 306 has three protrusions that connect to the corresponding central opening 524 and opposing side notches 526 and 528 in second end 520 of strap 500. Center protrusion 310 may have a snap-fit connection that snaps onto snap-fit protrusion 530.

In some embodiments second end 520 of strap 500 is only attached to strap connector 306 of neck cover 300 by an upward force on second end 520 of strap 500 forcing second end 520 into strap connector 306. Similarly, second end 520 of the strap 500 can only be detached from strap connector 306 of the neck cover by a downward force on second end 520 of strap 500 forcing second end 520 away from strap connector 306. Since second end 520 of strap 500 can only be attached by an upward force, strap 500 can only be attached to neck cover 300 when neck cover 300 is removed from container 200 (since otherwise container 200 would be in the way). Similarly, since second end 520 of strap 500 can only be detached by a downward force, strap 500 can only be detached from neck cover 300 when neck cover 300 is removed from container 200. Therefore, when neck cover 300 is attached to container 200, container 200 prevents second end 520 of strap 500 from being disconnected from strap connector 306 of neck cover 300. Container 200 thereby acts as a locking mechanism and keeps strap 500 in place when attached to neck cover 300.

Since neck cover 300, cap 400, and strap 500 are separate components, each piece may be customizable by the user of beverage system 100. For example, the user may select from a variety of different neck covers, caps, and straps to design a personalized beverage system 100.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A piercing apparatus for a beverage container, the piercing apparatus comprising:
    an inner ring composed of a rigid material;
    an outer ring composed of a flexible material, the outer ring having a lower portion that encompasses the inner ring and an upper portion that is disposed above the inner ring, wherein the inner ring constrains motion of the outer ring in the lower portion of the outer ring such that the upper portion of the outer ring has a greater range of motion than the lower portion of the outer ring; and
    a piercer composed of a rigid material that is connected to the inner ring by a plurality of arms that radially extend from the piercer to the inner ring,
    wherein the plurality of arms define a plurality of openings therebetween.

2. The piercing apparatus of claim 1, wherein the piercing apparatus detachably attaches to an opening of a beverage container,
    wherein the outer ring includes a protrusion that circumferentially protrudes outward from an outer surface of the outer ring, and
    wherein the protrusion creates a seal between the piercing apparatus and the opening of the beverage container when the piercing apparatus is attached to the opening of the beverage container.

3. The piercing apparatus of claim 1, wherein the upper portion of the outer ring is a cartridge retainer that flexes outward when a cartridge is inserted into the piercing apparatus.

4. The piercing apparatus of claim 3, wherein the cartridge retainer comprises a plurality of vertical slots formed in an inner surface of the cartridge retainer.

5. The piercing apparatus of claim 2, wherein the outer ring comprises a lip that circumferentially protrudes outward from an outer surface of the outer ring and is located between the protrusion and the upper portion of the outer ring.

6. The piercing apparatus of claim 1, wherein the outer ring further includes an inner protrusion that circumferentially protrudes inward from an inner surface of the outer ring toward the piercer, and
    wherein the inner protrusion and the upper portion of the outer ring create a seal between the piercing apparatus and a cartridge that is inserted into the piercing apparatus.

7. The piercing apparatus of claim 1, wherein the piercer defines a plurality of openings different from the plurality of openings between the plurality of arms.

8. The piercing apparatus of claim 1, wherein the flexible material is silicone.

9. The piercing apparatus of claim 1, wherein the outer ring and the inner ring are not separable.

10. The piercing apparatus of claim 1, wherein the lower portion of the outer ring encompasses both an outer surface of the inner ring and an inner surface of the inner ring.

11. The piercing apparatus of claim 1, wherein the outer ring is the outermost part of the piercing apparatus.

12. The piercing apparatus of claim 1, wherein the outer ring and the inner ring are in contact along their circumferences.

13. A beverage system comprising:
    a container;
    a piercing apparatus detachably attachable into a neck of the container via a press-fit connection between an outer surface of the piercing apparatus and an inner surface of the neck of the container, the piercing apparatus having a piercer composed of a rigid material, wherein the piercer protrudes upwardly from the piercing apparatus;
    a neck cover that attaches to an outer rim of the neck of the container, wherein the neck cover defines an upper opening;
    a cap that seals the upper opening of the neck cover; and
    a strap that connects the neck cover to the cap,
    wherein the piercing apparatus further comprises:
        an inner ring composed of a rigid material; and
        an outer ring composed of a flexible material, the outer ring having a lower portion that encompasses the inner ring and an upper portion that is disposed above the inner ring, wherein the inner ring constrains motion of the outer ring in the lower portion of the outer ring such that the upper portion of the outer ring has greater flexibility than the lower portion of the outer ring,
    wherein the piercer is connected to the inner ring by a plurality of arms that radially extend from the piercer to the inner ring, and
    wherein the plurality of arms define a plurality of openings therebetween.

14. The beverage system of claim 13, further comprising a cartridge that is openable through engagement with the piercer, the cartridge comprising a chamber, an opening, and a cover located over the opening, and wherein the cartridge contains one or more beverage ingredients.

15. The beverage system of claim 14, wherein when the piercing apparatus is attached into the neck of the container and the cartridge engages the piercer, the cartridge cover opens, thereby releasing the one or more beverage ingredients into the container.

16. The beverage system of claim 13, wherein the outer ring includes a protrusion that circumferentially protrudes outward from an outer surface of the outer ring, and
    wherein the protrusion creates a seal between the piercing apparatus and the neck of the container when the piercing apparatus is attached into the neck of the container.

17. The beverage system of claim 13, wherein the upper portion of the outer ring is a cartridge retainer that flexes outward when a cartridge is inserted into the piercing apparatus.

18. The beverage system of claim 17, wherein the cartridge retainer comprises a plurality of vertical slots formed in an inner surface of the cartridge retainer.

19. The beverage system of claim 13, wherein the flexible material is silicone.

20. The beverage system of claim 13, wherein the piercing apparatus is disposed below the upper opening of the neck cover when the piercing apparatus is attached into the neck of the container and the neck cover is attached to the outer rim of the neck of the container.

21. The beverage system of claim 13, wherein a liquid within the container can flow from the container to the upper opening of the neck cover when the piercing apparatus is attached into the neck of the container and the neck cover is attached to the outer rim of the neck of the container.

22. The beverage system of claim 13, wherein the piercing apparatus comprises a compressible rib, and wherein the compressible rib is compressed against the inner surface of the neck of the container when the piercing apparatus is attached into the neck of the container via the press-fit connection.

23. A piercing apparatus configured to detachably attach within a top opening of a beverage container, the piercing apparatus comprising:

an inner component composed of a rigid material;

an outer component composed of a flexible material that encompasses the inner component; and a piercer that is connected to the inner component by a plurality of arms that radially extend from the piercer to the inner component, wherein the plurality of arms define a plurality of openings therebetween, wherein the outer component includes a protrusion that circumferentially protrudes outward from an outer surface of the outer component, and wherein the protrusion compresses against an inner surface of a beverage container and creates a seal between the piercing apparatus and the inner surface when the piercing apparatus is inserted into a top opening of the beverage container.

24. The piercing apparatus of claim 23, wherein the piercer projects upward from a bottom of the piercing apparatus.

25. The piercing apparatus of claim 23, wherein the inner component and the outer component circumferentially surround the piercer.

26. The piercing apparatus of claim 23, wherein the inner component and the outer component define an engagement assembly that is configured to receive a cartridge containing a mixing solution, and wherein a top edge of the engagement assembly is configured to secure and seal the cartridge when the cartridge is received in the engagement assembly.

27. The piercing apparatus of claim 26, wherein the engagement assembly further comprises an inner rib that protrudes toward the piercer, and wherein the inner rib is disposed below the top edge of the engagement assembly.

28. The piercing apparatus of claim 23, wherein an upper surface of the piercing apparatus slopes toward an outer circumferential edge, and wherein the outer circumferential edge is a lip that is configured to engage with the top opening of the beverage container.

29. The piercing apparatus of claim 28, wherein the protrusion of the outer component is beneath the lip and does not project past the lip.

30. The beverage system of claim 23, wherein the inner component reduces the range of motion of the outer component.

\* \* \* \* \*